United States Patent [19]

Seddon et al.

[11] Patent Number: 4,598,180

[45] Date of Patent: Jul. 1, 1986

[54] OVERHEAD ELECTRIC TRACTION SYSTEMS

[75] Inventors: Alan E. Seddon, Rainford; Joseph Littler, Liverpool, both of England

[73] Assignee: BICC Public Limited Company, London, England

[21] Appl. No.: 223,906

[22] Filed: Jan. 9, 1981

[51] Int. Cl.$^4$ .............................................. B60M 1/04
[52] U.S. Cl. .......................................... 191/35; 191/31
[58] Field of Search .............................. 191/25, 31, 35

[56] References Cited

U.S. PATENT DOCUMENTS

| 2,824,913 | 2/1958 | Taylor | 191/35 X |
| 3,321,587 | 5/1967 | Ross | 191/35 |
| 3,439,131 | 4/1969 | Ross | 191/35 X |

Primary Examiner—Richard A. Schacher
Attorney, Agent, or Firm—Buell, Ziesenheim, Beck & Alstadt

[57] ABSTRACT

In an overhead electric traction system, an overhead contact wire is enclosed throughout its length within an elongate protective cover of resilient electrically insulating material. The cover is secured to the contact wire, is symmetrical about a longitudinally extending vertical plane passing through the axis of the contact wire and includes a pair of transversely extending base walls which underlie and are spaced from the contact wire and abut in the vertical plane. When engaged by a transversely extending elongate current collector carried by a travelling vehicle, the base walls are deflected upwardly and outwardly away from one another to expose the running surface of the contact wire and permit the current collector to effect electrical contact with and collect current from the contact wire; after passage of the current collector, the base walls return to their original undeflected positions so that the contact wire is again enclosed within the cover.

9 Claims, 1 Drawing Figure

U.S. Patent
Jul. 1, 1986
4,598,180
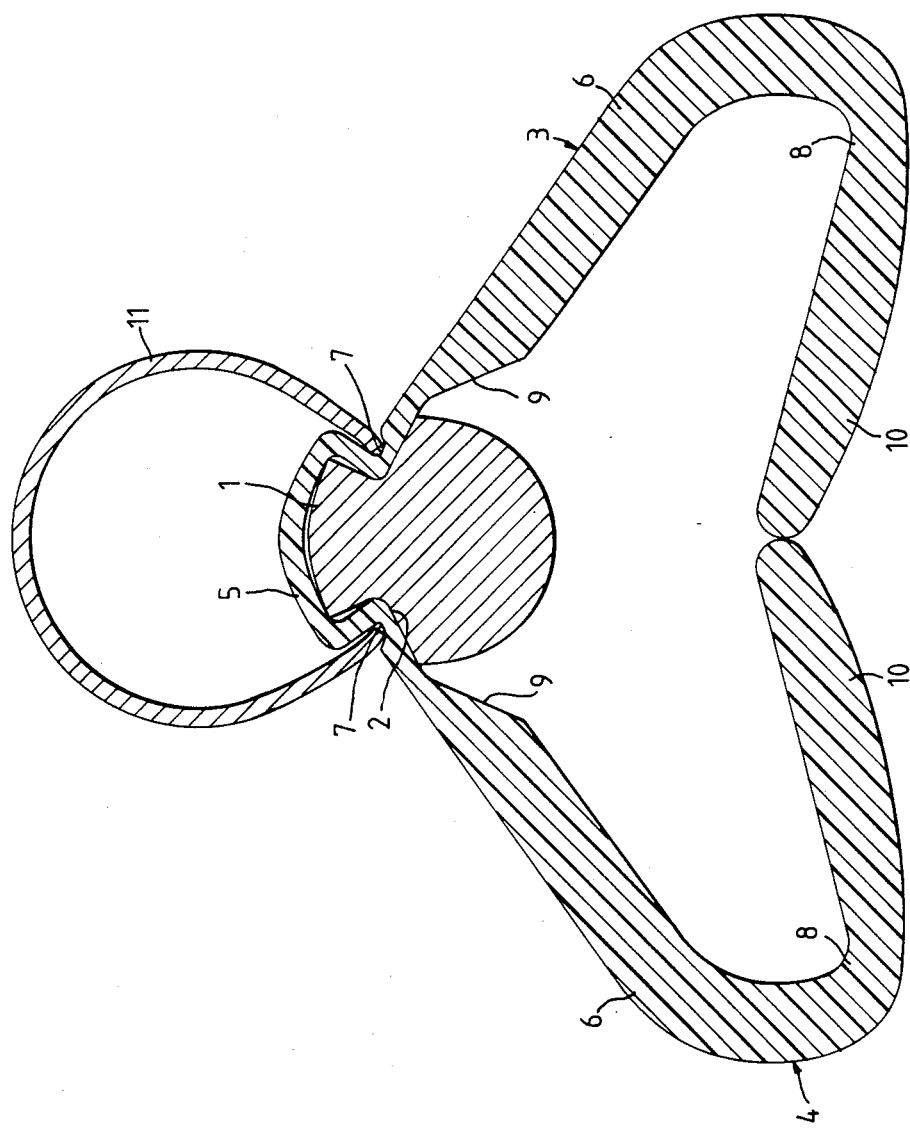

OVERHEAD ELECTRIC TRACTION SYSTEMS

This invention relates to overhead electric traction systems in which current is collected from an overhead contact wire by means of a collector of the kind comprising a bar which extends transversely of the contact wire and is, in its operative position, pressed upwards into contact with the underside of the contact wire, usually, but not in all cases, by mounting it on a spring loaded pantograph mechanism mounted on the roof of a vehicle.

Where an overhead electric traction system is installed in a mine, tunnel or any other location in which the overhead contact wire is supported at a distance above the ground less than that in conventional overhead electric traction systems, there is a substantially risk that an operative or other person carrying or using a tool or other implement may inadvertently touch the contact wire with the tool or other implement and receive an electric shock which, in some circumstances, might result in loss of life.

The present invention provides an overhead electric traction system suitable for use in a mine or tunnel and, according to the invention, the overhead electric traction system includes an overhead contact wire which throughout substantially the whole of its length is enclosed within an elongate protective cover of electrically insulating material, the elongate, being substantially symmetrical about a longitudinally extending vertical plane passing through the axis of the contact wire and having a pair of transversely extending base walls which underlie and are spaced from the contact wire and abut in or adjacent to said vertical plane and which, when engaged by a transversely extending elongate current collector carried by a travelling vehicle, will be deflected upwardly and outwardly away from one another to expose the running surface of the contact wire and permit the current collector to effect electrical contact with and collect current from the contact wire, and which, after passage of the current collector, will return to their original undeflected positions so that the contact wire is again enclosed within the cover. At least those parts of the transversely extending base walls that are contacted by a tranversely extending current collector are of an electrically insulating material that is preferably wear-resistant, e.g. polypropylene.

Where, as is preferred, the contact wire has a transverse cross-section of conventional form with recesses extending along its opposite sides, preferably the elongate protective cover is so shaped that it overlies, and makes a snap fit in the longitudinally extending recesses of, the contact wire, the pair of transversely extending base walls being suspended at the lower edges of at least two downwardly extending resilient walls positioned on opposite sides of the contact wire. In a preferred embodiment, the outer edges of the transversely extending base walls are integral with the lower edges of two downwardly extending resilient side walls which are themselves integral with and extend downwardly and outwardly from an apex which makes a snap fit in the recesses of the contact wire. To accommodate upward deflection of the base and side walls, preferably at the regions where the outer edges of the base walls are integral with the lower edges of the side walls and/or the upper edges of the side walls are integral with the apex, the wall thickness of he cover is reduced.

For ease of assembly, the elongate protective cover may be built-up of a plurality of separately formed elongate protective cover units arranged end to end; preferably adjacent units are welded together.

A plurality of longitudinally spaced clips may lock the elongate protective cover in engagement with the contact wire. Preferably, the clips are a resilient metal or metal alloy or of a rigid plastics material, e.g. polyvinyl chloride.

To provide for suspension of a protected contact wire of an overhead electric traction system, the longitudinally extending protective cover may be provided with longitudinally spaced holes through which clamping means can be attached directly to the contact wire.

The invention is further illustrated by a description, by way of example, of a preferred protected contact wire of an overhead electric traction system for use in a mine with reference to the accompanying drawing which shows a transverse cross-sectional view of the contact wire and its protective cover.

Referring to the drawing, the contact wire 1 has a profile of conventional form with longitudinally extending recesses 2 and, throughout substantially the whole of its length, is enclosed within a longitudinally extending protective cover 3 of polypropylene built-up of a plurality of separately formed elongate protective cover units 4 arranged end to end, adjacent units being welded together. The cover units 4 are locked to the contact wire 1 by longitudinally spaced resilient clips 11.

Each elongate protective cover unit 4 has a transverse cross-section of very approximately triangular form and, at its apex 5, is so shaped that it makes a snap fit in the recesses 2 of the contact wire 1. Integral with and extending outwardly and downwardly from opposite sides of the shaped apex 5 of each cover unit 4 are two side walls 6 and, integral with and extending transversely inwardly from the lower edges of the side walls, are two transversely extending base walls 10, the inner longitudinally extending edges of the two base walls abutting in the vertical plane passing through the axis of the contact wireso that the contact wire 1 is fully enclosed within, and protected by, the cover 3. At the positions where the upper edges of the side walls 6 are integral with the shaped apex 5, the thickness of the side walls is substantially reduced by the provision in the outer surfaces of the walls of longitudinally extending recesses 7 which serve to permit upward deflection of the side walls and outward deflection of the base walls 10. Upward deflection of the base walls 10 is facilitated by the provision of recesses 8 of reduced thickness between the outer edges of the base walls and the lower edges of the side walls 6. At regions 9 on the inner surfaces of the side walls 6 adjacent the rounded undersurface of the contact wire 1, the thickness of the side walls decreases smoothly and gradually in an upward direction to allow the resilience of the material of the cover 3 to return the deflected base walls 10 to their original positions in which their inner edges abut. As will now be described, the base walls 10 constitute, in effect, flaps which can be deflected upwardly and outwardly by a transversely extending elongate current collector carried by a travelling vehicle to expose the running surface of the contact wire 1.

As a vehicle travels along a track beneath the protected contact wire 1, the transversely extending elongate current collector carried by a pantograph mounted on the roof of the vehicle engages the undersurfaces of the base walls 10 causing each base wall to pivot upwardly about a longitudinally extending axis adjacent to the neck 8 and each side wall 6 to pivot upwardly about a longitudinally extending axis adjacent the recess 7, thereby exposing the running surface of the contact wire to a sufficient extent to permit the current collector to effect electrical contact with and collect current from the contact wire.

Downstream of the transversely extending current collector of the travelling vehicle, the resilience of the material of the cover 3 is sufficient to urge the base walls 10 back to their normal abutting positions so that the contact wire is again fully enclosed within, and protected by, the cover.

What we claim as our invention is:

1. In an overhead electric traction system comprising an overhead contact wire from which current is collected by means of an elongate current collector which extends transversely of the overhead contact wire and which is carried by a travelling vehicle, the overhead contact wire is enclosed throughout substantially the whole of its length within an elongate protective cover of electrically insulating material, the elongate protective cover being secured to the contact wire, being substantially symmetrical about a longitudinally extending vertical plane passing through the axis of the contact wire and having a pair of transversely extending base walls which underlie and are spaced from the contact wire and abut in or adjacent said vertical plane and which, when engaged by a transversely extending elongate current collector carried by a travelling vehicle, will be deflected upwardly and outwardly away from one another to expose the running surface of the contact wire and permit the current collector to effect electrical contact with and collect current from the contact wire and which, after passage of the current collector, will return to their original undeflected positions so that the contact wire is again enclosed within the cover.

2. An overhead electric traction system as claimed in claim 1, wherein at least those parts of the transversely extending base walls that are contacted by a transversely extending elongate current collector are of an electrically insulating material that is wearresistant.

3. An overhead electric traction system as claimed in claim 1, in which the contact wire has recesses extending along its opposite sides, wherein the elongate protective cover is so shaped that it overlies, and makes a snap fit in the longitudinally extending recesses of, the contact wire and has at least two downwardly extending resilient walls positioned on opposite sides of the contact wire, the pair of transversely extending base walls being suspended at the lower edges of said resilient walls.

4. An overhead electric traction system as claimed in claim 3, wherein the elongate protective cover comprises an apex which makes a snap fit in the recesses of the contact wire and two resilient walls whose upper edges are integral with, and which extend downwardly and outwardly from, the apex; the outer edges of the transversely extending base walls being integral with the lower edges of the side walls.

5. An overhead electric traction system as claimed in claim 4, wherein at the regions where the outer edges of the base walls are integral with the lower edges of the side walls and the upper edges of the side walls are integral with the apex, the wall thickness of the cover is reduced.

6. An overhead electric traction system as claimed in claim 4, wherein the elongate protective cover is made of polypropylene.

7. An overhead electric traction system as claimed in claim 1, wherein a plurality of longitudinally spaced clips lock the elongate protective cover in engagement with the contact wire.

8. An overhead electric traction system as claimed in claim 7, wherein the longitudinally extending clips are of a resilient material.

9. An overhead electric traction system as claimed in claim 1, wherein the elongate protective cover is built up of a plurality of separately formed elongate protective cover units arranged end to end.

* * * * *

UNITED STATES PATENT AND TRADEMARK OFFICE
CERTIFICATE OF CORRECTION

PATENT NO. : 4,598,180

DATED : July 1, 1986

INVENTOR(S) : ALAN E. SEDDON, JOSEPH LITTLER

It is certified that error appears in the above-identified patent and that said Letters Patent is hereby corrected as shown below:

Column 1, line 29, after elongate delete "," and insert --protective cover being secured to the contact wire,--.

Column 2, line 7, after are, insert --of--.

Column 2, line 42, change "wireso" to --wire so--.

Column 4, line 2, change "wearresistant" to --wear-resistant--.

Column 4, line 16, after resilient, insert --side--.

Signed and Sealed this

Twenty-eighth Day of October, 1986

[SEAL]

*Attest:*

DONALD J. QUIGG

*Attesting Officer*     *Commissioner of Patents and Trademarks*